J. W. FRENCH.
EYEPIECE PRISM COMBINATION FOR USE IN OPTICAL INSTRUMENTS OF THE SELF CONTAINED BASE TYPE ADAPTED TO BE USED FOR RANGEFINDING.
APPLICATION FILED MAY 29, 1918.
1,322,780.  
Patented Nov. 25, 1919.  
2 SHEETS—SHEET 1.
FIG: 3.
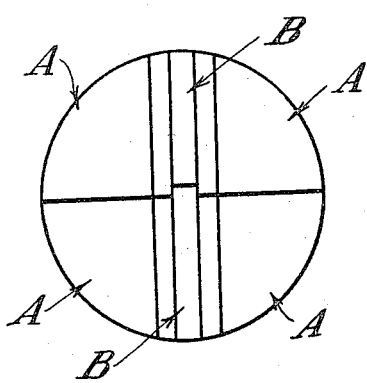
FIG: 5.
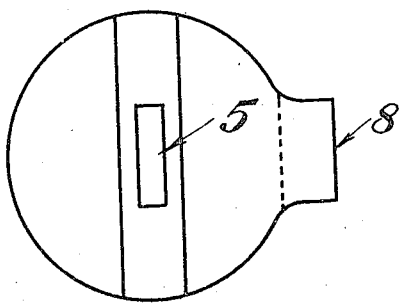
FIG: 1.
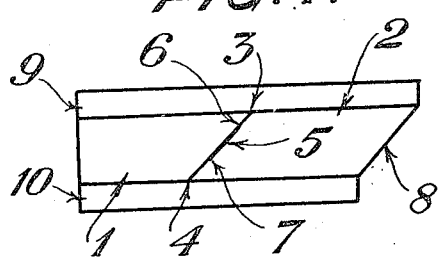
FIG: 6.
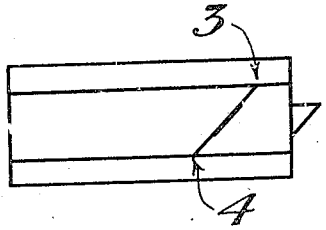
FIG: 2.
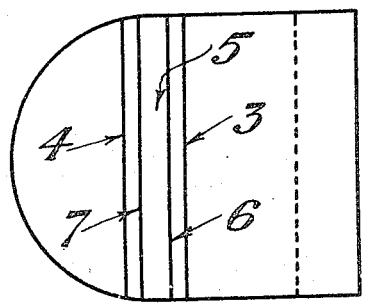
FIG: 4.
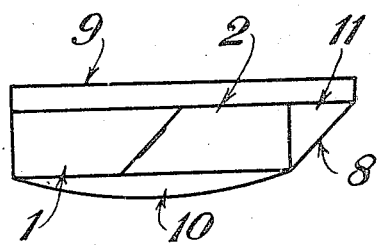
Inventor:
James Weir French.
By T. Walter Fowler
Atty.

J. W. FRENCH.
EYEPIECE PRISM COMBINATION FOR USE IN OPTICAL INSTRUMENTS OF THE SELF CONTAINED BASE TYPE ADAPTED TO BE USED FOR RANGEFINDING.
APPLICATION FILED MAY 29, 1918.
1,322,780.   Patented Nov. 25, 1919.
2 SHEETS—SHEET 2.
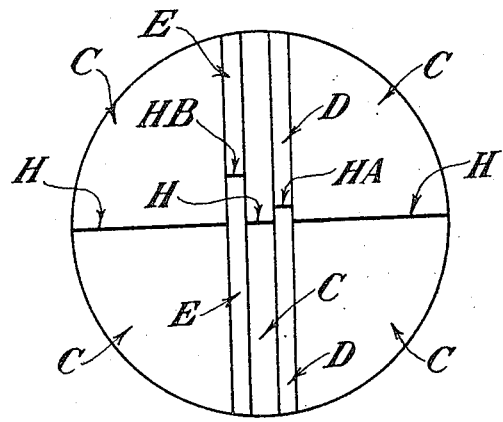
FIG: 8.
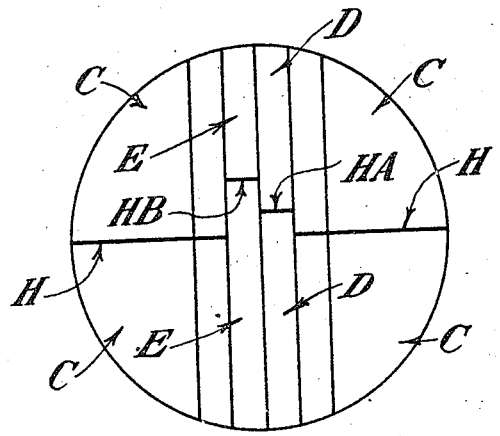
FIG: 11.
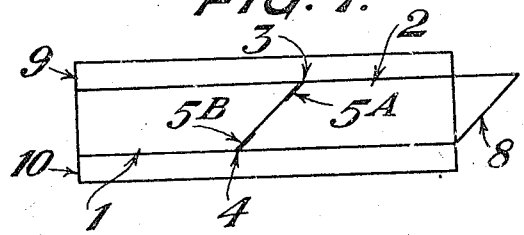
FIG: 7.
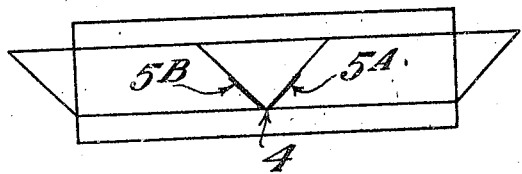
FIG: 10.
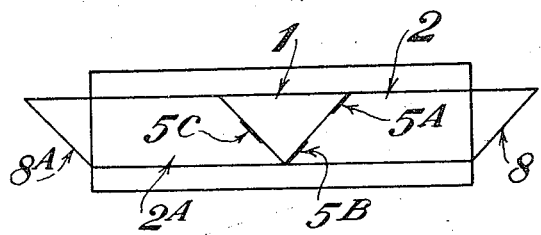
FIG: 9.
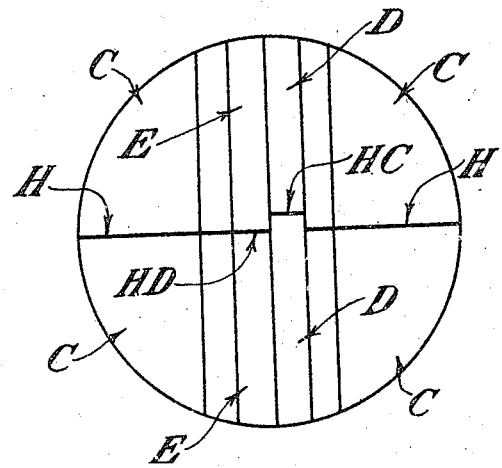
FIG: 12.
FIG: 13.
Inventor
James Weir French.
By T. Walter Fowler
Atty.

UNITED STATES PATENT OFFICE.

JAMES WEIR FRENCH, OF ANNIESLAND, GLASGOW, SCOTLAND, ASSIGNOR TO BARR AND STROUD, LIMITED, OF ANNIESLAND, GLASGOW, SCOTLAND.

EYEPIECE PRISM COMBINATION FOR USE IN OPTICAL INSTRUMENTS OF THE SELF-CONTAINED BASE TYPE ADAPTED TO BE USED FOR RANGEFINDING.

1,322,780.  Specification of Letters Patent.  Patented Nov. 25, 1919.

Application filed May 29, 1918. Serial No. 237,272.

*To all whom it may concern:*

Be it known that I, JAMES WEIR FRENCH, a subject of the King of Great Britain and Ireland, and of Caxton street, Anniesland, Glasgow, Scotland, have invented new and useful improvements in or connected with eyepiece prism combinations for use in optical instruments of the self-contained base type adapted to be used for rangefinding, of which the following is a specification.

This invention refers to eyepiece prism combinations for use in optical instruments of the self-contained base type comprising two or more telescope systems adapted to be used for rangefinding wherein the rays of light which pass through the respective telescope systems are combined at or near a common focal plane by a system of "eyepiece prism combinations", usually so termed because the combined images in that focal plane are observed directly or ultimately by the eyepiece of the instrument.

According to this invention eyepiece prism combinations are produced in which the thickness of the parts constituting a prism combination is small in comparison with their lateral dimensions and of such construction that of rays of light of a main system proceeding is what may be termed the normal direction some are permitted to pass directly through the combination, while others are obstructed by means provided in the prism combination, which means not only act to obstruct these rays of the main system but operate to so reflect rays of a subsidiary system or systems that they emerge from the prism combination in the normal direction together with those of the main system that pass directly through and combine therewith to form the field of view to be observed.

In constructions according to this invention eyepiece prism combinations are composed of two or more principal parts having oblique transverse faces, two or more of such principal parts being assembled with their oblique transverse faces contiguous so as to produce a prism combination with incident and emergent faces parallel, and having portions of principal parts extending laterally beyond the area in which the oblique transverse faces are contained between the incident and emergent faces, the thickness of the assembled parts being small in comparison with their lateral dimensions, to either or each of which faces a plate of glass (or other suitable material) may be cemented, which permit rays of light of the main system proceeding in the normal direction to pass directly through the prism combination, while the obstruction required of rays of the main system and the reflection of rays of the subsidiary system or systems are obtained by the whole or a portion or portions of the contiguous oblique faces being made light reflecting, associated, if required, with a reflector or reflectors or a prism or prisms which may constitute a part or parts of the eyepiece prism combinations, for effecting the diversion of rays of the subsidiary system or systems from the normal direction onto the reflecting surface or surfaces.

In eyepiece prism combinations according to this invention, glass or other suitable material, hereinafter referred to generally as glass, of parallel plate form may be used from which to make the principal parts, and the thickness of the plates assembled to form the prism combination is made small in comparison with their lateral dimensions; further, the thickness may correspond with a definite angular value in the field of view to be produced.

Eyepiece prism combinations according to this invention are particularly suitable for use in instruments such as rangefinders comprising reflectors at the ends of a self-contained base with an eyepiece located between the ends, of the type in which the optical parts are so arranged that the rays of the main and subsidiary systems directed by the respective telescope systems ultimately enter the eyepiece prism combination from one and the same direction; they are also particularly suitable for use in instruments of the periscope rangefinder type for use on board submarines where two or more reflectors are provided at different heights on a vertical base from which the rays proceed directly downward or ultimately are so directed as to enter the eyepiece prism in one and the same direction; they are also applicable for use in other types of such instruments in which the rays of the main and subsidiary systems do not enter the prism combination from one and the same direction.

Some examples of eyepiece prism combinations will now be described with reference to the accompanying drawings, and in describing the forms illustrated it will be assumed that they are for use in an instrument of the periscope rangefinder type having a comparatively large main field of view combined with a subsidiary strip field or fields of smaller angular width.

In the drawings, Figure 1 is a side elevation and Fig. 2 is a plan of a prism combination. Fig. 3 indicates the type of field obtained by this combination, and Fig. 4 is a side elevation embodying modifications of this construction.

Fig. 5 is a plan and Fig. 6 is a side elevation illustrating further modifications.

Fig. 7 is a side elevation, Fig. 9 is a view of a modification thereof, and Fig. 8 indicates the type of field obtained by these prism combinations.

Fig. 10 is a side elevation of a modification and Figs. 11 and 12 indicate the type of fields which may be obtained with the use of this prism combination in two different forms of periscope rangefinders.

Fig. 13 is a side elevation of a modification for use in a periscope instrument comprising three rangefinders.

In the construction illustrated at Figs. 1 and 2, the principal portion of the combination consists of two principal parts 1 and 2 having oblique transverse faces 3, 4, formed from a plate of glass of appropriate thickness, which are joined together at their transverse faces. For instance, they may be cemented together with Canada balsam. A portion of this joint is made light obstructing to main rays and light reflecting to subsidiary rays, for example, by the deposition of a layer of silver, the portion in this case consisting of a band 5, which extends across the prism combination, see Fig. 2, the edges of the band 5 which are parallel to the surfaces of the principal parts being designated 6 and 7. The part 2 is formed with an additional oblique transverse face which forms a reflector 8, extending across the prism combination as indicated. In this case portions of each of the principal parts 1 and 2 extend laterally beyond the area in which the oblique transverse faces 3, 4, are contained between the surfaces of the principal parts. In a periscope rangefinder having an upper and a lower reflector only fitted with a prism combination of this construction, a field of view, as indicated at Fig. 3, may be produced wherein the portions A A represent light from, say, the upper reflector of the instrument which passes in the normal direction through the plate formed by the principal parts 1 and 2. The light proceeding from the upper reflector, which otherwise would also fill the strip B, is intercepted by the band 5. The strip B of the field of view is, however, filled by light proceeding from the lower reflector of the instrument, which passes in the normal direction onto the reflector 8 and is diverted thereby onto the band 5 by which it is reflected so as to emerge from the prism combination in the normal direction and thus complete the field of view.

The lines produced by the junction of the faces 3, 4, on the surfaces of the parts 1, 2, may be so formed as to be apparent in the field of view, or they may be made invisible or nearly so. For instance, the lines can be made practically invisible if (after the parts 1 and 2 are cemented together and the incident and emergent faces are worked so as to insure clean sharp edges) plates of glass (or other suitable material) 9, 10, which may be applied to extend over the junctions are cemented to those faces, see Fig. 1, by means of cement having approximately the same refractive index as the glass. In some cases only one of the plates 9, 10, is fitted. By fitting plates 9, 10, or one only of them, the parts 1 and 2 will be more securely held together. Further, one or each of the plates 9, 10, may be made to form a lens of the optical system and thus reduce the number of transmitting faces which otherwise would exist if, for example, a separate field lens was provided. As it is not essential that reflectors such as 8 should be formed on an integral portion of the part 1, or 2, plates such as 9, 10, may be arranged to also assist in securing a separate prism comprising a reflecting surface 8. An example of a prism combination embodying such features is indicated at Fig. 4, wherein the parts 1 and 2 are associated with plates 9, 10, of which 10 is formed as a field lens and 9 assists to hold a prism 11, having a reflecting face 8, more securely to part 2, all of which parts are cemented together at the joints of their contiguous faces.

The horizontal lines shown in the field of view at Fig. 3, and in other figures illustrating fields of view, represent an object, the partial images of which have not been brought into coincidence.

It is not essential that the strip B should be formed to extend entirely across the field, for instance, as illustrated at Fig. 5, the band 5 may be formed to extend only partly across the prism combination and in such cases the reflector 8 may be made correspondingly shorter. Neither is it essential that the strip B should be formed in the middle of the field, for instance, as illustrated at Fig. 6, the joint between the oblique transverse faces 3, 4, may be placed nearer to one side.

Some examples will now be described of the construction of eyepiece prism combinations according to this invention, suitable for use in periscope range-finders comprising two rangefinders of the type in which the base is provided with a top, an intermediate and a bottom reflector, one of the rangefinders comprising, say, the top and intermediate reflectors, the other the top and bottom reflectors. The top reflector is thus common to both rangefinders and may constitute the periscope reflector.

In the construction shown at Fig. 7, two portions between the oblique faces 3, 4, of the principal parts 1, 2, are silvered to form bands $5^A$, $5^B$. The field of view produced in this case is indicated at Fig. 8, wherein the portions C represent light derived from the top reflector which may be restricted to fall within the limits of the plate 9. The strip D represents light derived from, say, the intermediate reflector restricted to fall upon the upper part of reflector 8 and diverted thereby onto reflector $5^A$, in which case the strip E represents light derived from the bottom reflector restricted to fall upon the lower part of reflector 8 and diverted thereby onto the reflector $5^B$.

A modified construction of eyepiece prism combination by which the same character of field as indicated at Fig. 8 is produced, is shown at Fig. 9. In this case the principal portion of the combination consists of three principal parts 1, 2 and $2^A$, having oblique transverse faces 3, 4 and $3^A$, 4, with corresponding reflector bands $5^A$, $5^B$, a reflector 8 being associated with the part 2, and a similar reflector $8^A$ with the part $2^A$. In this construction portions of the principal parts 2 and $2^A$ extend laterally beyond the area in which the oblique transverse faces 3, 4 and $3^A$, 4, are contained between the surfaces of the principal parts.

For rangefinding with an instrument fitted with prism combinations according to Fig. 7 or 9, coincidence is made between the horizontal line H and HA when using, say, the short base rangefinder, and between the horizontal line H and HB when using the long base rangefinder.

Fig. 10 illustrates a further modification which corresponds with Fig. 9, except that the reflector bands $5^A$, $5^B$, meet along the line 4. The field of view produced in this case is indicated at Fig. 11, wherein the portions C represent light from the top reflector, D light from, say, the intermediate reflector, in which case E represents light from the bottom reflector of the instrument. For rangefinding, coincidence is made between the horizontal line H and HA when using, say, the short base rangefinder, and between the horizontal line H and HB when using the long base rangefinder. As the relative positions of the horizontal lines HA and HB have in this instance no relationship for rangefinding purposes, a thick line may be produced between the portions D and E in order to avoid confusion in deciding where coincidence is required to be made.

Eyepiece prism combinations of the character illustrated at Fig. 10 are also adapted for use in an instrument comprising a rangefinder having an upper and a lower reflector at the ends of its base, associated with a periscope comprising a top reflector which is not used for rangefinding. The field of view produced in this case is indicated at Fig. 12, wherein the portions C represent light from the top or periscope reflector, D light from the upper reflector of the rangefinder and E light from the lower reflector of the rangefinder. For rangefinding, coincidence is made between the horizontal lines HC and HD. In this case, as the relative positions of the lines HC and HD have no relationship for rangefinding purposes with the horizontal line H, thick lines may be produced between the portions C and D, and C and E, to avoid confusion in deciding where coincidence is required to be made.

It will be recognized that since the rangefinder fields D and E are not directly associated with the periscope field C, they may be of a different magnifying power, at least so far as the direction along the separating line is concerned, usually a higher power to that of the field C. Whereas in the types of fields indicated at Figs. 3, 8 and 11, since the periscope field is common to the rangefinder fields, they must be of the same magnifying power.

Fig. 13 illustrates an example of the construction of an eyepiece prism combination according to this invention suitable for use in a periscope instrument comprising three rangefinders. This construction comprises the association of features illustrated at Figs. 7 and 8, in that the principal portion consists of principal parts 1, 2 and $2^A$, associated with reflector bands $5^A$, $5^B$ and $5^C$, and reflectors 8 and $8^A$. An instrument for which this eyepiece is suitable may have a base comprising a top periscope reflector common to three rangefinders, each comprising a reflector, arranged one below the other at suitable distances apart beneath the periscope reflector. In this case light from the top reflector is adapted to pass through the plate formed by the principal parts 1, 2 and $2^A$, except where obscured by the bands $5^A$, $5^B$, $5^C$, and light from the three rangefinder reflectors may be diverted respectively by the upper part of 8, the lower part of 8, and by $8^A$ onto their respective reflector bands $5^A$, $5^B$ and $5^C$.

In the construction of eyepiece prism combinations according to this invention, micrometer lines embracing any known angular field can readily be produced in the field of view. For instance, surface crevices at the junction of any or all of the parts 1, 2 and $2^A$ may be filled in with opaque material, such as lamp black. The width of any or all of such bands as 5, 5^A, 5^B, 5^C, may be made to represent any required value in this respect. Further, the space intervening between the edge of a band and a crevice or crevices may be made to represent a definite value.

I claim:

1. Eyepiece prism combinations consisting of principal parts having oblique transverse faces assembled with their oblique faces contiguous and incident and emergent faces parallel, and having portions of said principal parts extending laterally beyond the area in which the oblique faces are contained between the incident and emergent faces, the thickness of the assembled parts being small in comparison with their lateral dimensions, in combination with means at the oblique faces for obstructing rays of one system and reflecting rays of another system, for the purposes set forth.

2. Eyepiece prism combinations consisting of principal parts having oblique transverse faces assembled with their oblique faces contiguous and incident and emergent faces parallel, and having portions of said principal parts extending laterally beyond the area in which the oblique transverse faces are contained between the incident and emergent faces, the thickness of the assembled parts being small in comparison with their lateral dimensions, in combination with means at a portion of the oblique faces, light obstructing to main rays and light reflecting to subsidiary rays, for the purposes set forth.

3. Eyepiece prism combinations consisting of principal parts having oblique transverse faces assembled with their oblique faces contiguous and incident and emergent faces parallel, and having portions of said principal parts extending laterally beyond the area in which the oblique transverse faces are contained between the incident and emergent faces, the thickness of the assembled parts being small in comparison with their lateral dimensions, in combination with a layer of silver at a portion of the oblique faces, for the purposes set forth.

4. Eyepiece prism combinations consisting of principal parts having oblique transverse faces assembled with their oblique faces contiguous and incident and emergent faces parallel, and having portions of said principal parts extending laterally beyond the area in which the oblique transverse faces are contained between the incident and emergent faces, the thickness of the assembled parts being small in comparison with their lateral dimensions, in combination with a band at the oblique faces, having edges parallel with the surfaces of the principal parts, light obstructing to main rays and light reflecting to subsidiary rays, for the purposes set forth.

5. Eyepiece prism combinations consisting of two principal parts having oblique transverse faces assembled with their oblique faces contiguous and incident and emergent faces parallel, a portion of each principal part extending laterally beyond the area in which the oblique transverse faces are contained between the incident and emergent faces, two plates of suitable material, one cemented to the incident face the other to the emergent face, the thickness of the assembled parts being small in comparison with their lateral dimensions, in combination with means at a portion of the oblique faces, light obstructing to main rays and light reflecting to subsidiary rays, for the purposes set forth.

6. Eyepiece prism combinations consisting of two principal parts having oblique transverse faces assembled with their oblique faces contiguous and incident and emergent faces parallel, a portion of each principal part extending laterally beyond the area in which the oblique transverse faces are contained between the incident and emergent faces, two plates of glass, one cemented to the incident face the other to the emergent face, the thickness of the assembled parts being small in comparison with their lateral dimensions, in combination with means at a portion of the oblique faces, light obstructing to main rays and light reflecting to subsidiary rays, associated with means for diverting subsidiary rays passing in the normal direction onto the portion of the oblique faces light reflecting to such rays, for the purposes set forth.

7. Eyepiece prism combinations consisting of two principal parts having oblique transverse faces assembled with their oblique faces contiguous and incident and emergent faces parallel, a portion of each principal part extending laterally beyond the area in which the oblique transverse faces are contained between the incident and emergent faces, a plate made to form a lens cemented to one of the faces, the thickness of the assembled parts being small in comparison with their lateral dimensions, in combination with means at a portion of the oblique faces, light obstructing to main rays and light reflecting to subsidiary rays, for the purposes set forth.

JAMES WEIR FRENCH.

Witnesses:
J. G. STEWART,
ROBERT ALLAN.